United States Patent [19]
Neuman et al.

[11] Patent Number: 5,958,816
[45] Date of Patent: Sep. 28, 1999

[54] METHOD OF PRESULFIDING AND PASSIVATING A HYDROCARBON CONVERSION CATALYST

[75] Inventors: Daniel J. Neuman, Owings Mills, Md.; Gunther K. Semper, McAlester; Thomas Creager, Crowder, both of Okla.

[73] Assignee: Tricat, Inc., McAlester, Okla.

[21] Appl. No.: 08/807,423

[22] Filed: Feb. 28, 1997

[51] Int. Cl.$^6$ .............................. B01J 20/34; B01J 38/22; B01J 38/02; B01J 27/02
[52] U.S. Cl. ................................. 502/38; 502/34; 502/45; 502/56; 502/216
[58] Field of Search .................. 502/34, 38, 45, 502/56, 216

[56] References Cited

U.S. PATENT DOCUMENTS

| | | | |
|---|---|---|---|
| 3,453,217 | 7/1969 | Kozlowski et al. | 252/430 |
| 4,857,285 | 8/1989 | Gal | 423/230 |
| 4,925,632 | 5/1990 | Thacker et al. | 422/142 |
| 5,178,749 | 1/1993 | Lopez et al. | 208/58 |
| 5,292,702 | 3/1994 | Seamans et al. | 502/219 |

*Primary Examiner*—Gary P. Straub
*Assistant Examiner*—Alexander G. Ghyka
*Attorney, Agent, or Firm*—Robert J. Baran

[57] ABSTRACT

This invention relates to a method for sulfiding hydrocarbon conversion catalysts, e.g., hydrotreating catalysts comprising at least one metal sulfide and passivating said sulfided catalyst. The catalysts which may be treated by the method of the present invention comprise an alumina or an silica-alumina support e.g., a zeolite, and at least one Group VI metal sulfide and/or at least one Group VIII metal sulfide. In particular, the present invention provides a process for continuously activating a fresh or regenerated catalyst comprising at least one Group VI or Group VIII metal oxide supported on a particulate refractory oxide support material by converting substantially all of said Group VI or Group VIII metal oxide to the corresponding metal sulfide and passivating the resulting activated catalyst.

30 Claims, 3 Drawing Sheets

METHOD OF PRESULFIDING AND PASSIVATING A HYDROCARBON CONVERSION CATALYST

FIELD OF THE INVENTION

This invention relates to a method for activation, via sulfiding, of hydrocarbon conversion catalysts, e.g., hydrotreating catalysts comprising at least one metal oxide, and the subsequent passivation of said activated hydrotreating catalysts to protect them from oxidation. The catalysts which may be treated by the method of the present invention comprise an alumina or an silica-alumina support, e.g., a zeolite, and at least one Group VI metal oxide and/or at least one Group VIII metal oxide.

DESCRIPTION OF THE ART

The present invention provides a method for treating hydrocarbon conversion catalysts, comprising a component selected from the group consisting of alumina and/or silica-alumina, e.g., a zeolite (said component having a silica:alumina ratio of 1:99 to 90:10) and comprising at least one hydrogenating component, the total hydrogenating component weight being from 1% to 30% of the entire catalyst. Representative of such catalysts are hydrofining catalysts comprising nickel oxide or cobalt oxide and molybdenum oxide or tungsten oxide in association with an alumina support, and hydrofining-hydrocracking catalysts comprising nickel oxide or cobalt oxide and molybdenum oxide or tungsten oxide in association with a silica-alumina support containing from 1 to 40 weigh percent silica. It is known that such catalysts, once sulfided, are pyrophoric, and present storage problems when it is desired to store them for an extended period of time between their manufacture and their use in hydrotreating processes. Because of their pyrophoric nature, they can self heat by reacting exothermally with oxygen in the atmosphere when exposed to the atmosphere, to the extent that a fire hazard can result.

A process for preparing a hydrotreating process catalyst comprising alumina and at least one Group VI metal sulfide hydrogenating component, and at least one Group VIII metal sulfide hydrogenating component, is disclosed in U.S. Pat. No. 3,453,217, which comprises protecting said metal sulfides against reaction with oxygen by introducing in the liquid form into the pores of said catalyst a hydrocarbon protective material before exposure of said catalyst to an oxygen-containing atmosphere has caused more than 3 weight percent of said metal sulfides to be converted to other compounds.

In the process disclosed in this patent, a catalyst comprising metal hydrogenation components as the metal oxides are passed as particles through a sulfiding reactor in countercurrent contact with a rising gaseous sulfiding agent, which may comprise a mixture of hydrogen sulfide with hydrogen or carbon dioxide. In this process, as disclosed, the particulate catalyst contacts the rising sulfiding agent in free-flow descent through the upper zone of the sulfiding reactor and, substantially, as a fixed bed at the bottom or catalyst of the reactor. This process does not provide optimum intimate contact between the particulate catalyst and the sulfiding agent.

Therefore, to obtain the conversion of substantially all of the metal oxides into the corresponding sulfide, long residence times or high temperatures in the reactor are required.

None of the prior art methods, including previously discussed method, for presulfiding hydrocarbon conversion catalyst, especially hydrotreating catalysts comprising one or more Group VI and/or Group VIII metal hydrogenation components on an alumina and/or an silica alumina support that have been regenerated after loss of activity by calcining in an oxygen environment provide optimum conversion of the metal oxides, resulting from the regeneration of the inactive catalyst, into the active metal sulfide hydrogenation components. Also, none of the prior art methods for passivation of such regenerated hydrocarbon catalysts provide optimum stability from oxidation without incorporating a protecting liquid hydrocarbon in the pores of said catalyst.

Therefore, it is an object of the present invention to provide a method or process for presulfiding a hydrocarbon conversion catalyst by converting metal oxides, selected from the group consisting of Group VI metal oxides, Group VIII metal oxides and mixtures thereof, which may result from the regeneration of a hydrocarbon conversion catalyst, comprising one or more Group VI and/or Group VIII metal sulfide hydrogenation components supported on alumina and/or an silica alumina support into the respective catalytically-active metal sulfides and passivating the resulting presulfided hydrocarbon conversion catalyst against spontaneous or self heating when exposed to air.

Other objects and advantages of the instant invention will become apparent from the following description taken in connection with the accompanying figures, wherein is set forth by way of illustration and example the preferred embodiment of this invention.

BRIEF SUMMARY OF THE INVENTION

The present invention provides a process for continuously activating a fresh or regenerated catalyst comprising at least one Group VI or Group VIII metal oxide, e.g., an oxide of cobalt, molybdenum, nickel and/or tungsten, or preferably a mixture of molybdenum oxides and cobalt or nickel oxides, in an amount of from about 10 to 25 percent, by weight, molybdenum oxides and about 2 to 6 percent, by weight, of cobalt or nickel oxides, supported on a particulate refractory oxide support material, e.g., alumina or an silica alumina zeolite, by converting substantially all of said Group VI or Group VIII metal oxides to the corresponding metal sulfides and passivating the resulting activated catalyst, which comprises the steps of:

(A) sulfiding such fresh or regenerated catalyst by:
   (1) establishing at least one ebullating or expanded bed by passing a gaseous stream comprising hydrogen sulfide and hydrogen upwardly through a plurality of particles of said fresh or regenerated catalyst confined in an activation zone,
   (2) establishing at least one downflow zone and at least one upflow zone wherein each down flow zone is in fluid communication with a downstream upflow zone within each bed and maintaining the height of the particles in each upflow zone at the same height as the height of the particles in the adjacent up stream downflow zone to provide a looped pathway in said ebullating or expanded bed,
   (3) passing said regenerated or fresh catalyst into said ebullating or expanded bed and moving said fresh or regenerated catalyst along said looped pathway, and
   (4) removing a catalyst comprising substantially all of the Group VI and/or Group VIII metals as sulfides; and (B) passivating such sulfided or active catalyst by
   (1) establishing at least one ebullating or expanded bed by passing a gaseous stream comprising oxygen upwardly through a plurality of activated catalyst confined in a passivation zone, (2) establishing at least one downflow zone and at least one upflow zone wherein each down flow zone is in fluid communication with a downstream upflow zone within each bed and maintaining the height of the particles in each upflow zone at the same height as the height of the particles in the adjacent up stream downflow zone to provide a looped pathway in said ebullating or expanded bed, (3) passing said activated catalyst into said ebullating or expanded bed and moving said activated catalyst along said looped pathway, and (4) removing a passivated catalyst that is resistant to self heating by reacting exothermally with atmospheric oxygen;

Preferably, in the process of this invention, said looped pathway in said activation zone changes in direction at least about 360° or, more preferably, 540° from the beginning to the end.

Furthermore, in the process of this invention, said bed may be expanded in either or both the activation zone and/or the passivation zone by passing said gas therethrough at conditions sufficient to provide a bed volume that is about 10 to 100 percent greater than the volume of the packed bed. The gas for activating the fresh or regenerated catalyst and expanding the bed may comprise from about 3 to 10 percent by volume hydrogen sulfide and from 3 to 10 percent by volume hydrogen with the remainder being inert gas, preferably nitrogen in said activation zone. In said passivation zone the gas for passivating the activated catalyst and expanding the bed may comprise from 0.25 to 21 percent by volume oxygen, preferably from 0.25 to 2.5 percent by volume oxygen, with the remainder of said gas being an inert gas such as nitrogen, carbon dioxide, etc. In one embodiment, said oxygen is provided by air.

Furthermore, said fresh or regenerated catalyst may be contacted in said activation zone with said gas at a temperature sufficient to convert Group VI and Group VIII metal oxides to the corresponding sulfides but not greater than about 750° F.

In another aspect of the invention, a process is disclosed for continuously activating and passivating a regenerated catalyst which has been deactivated by use in a petroleum conversion process whereby sufficient carbon and sulfur have been deposited on the surface thereof to substantially reduce the catalytic activity and said deactivated catalyst has been regenerated by calcining in an oxygen-containing gas to remove said carbon and sulfur and, as a result of said calcining, one or more Group VI metal or Group VIII metal components included in said catalyst are oxidized to the metal oxides, which comprises the steps of:

(1) establishing at least one ebullating or expanded bed each said bed having a vertical dimension substantially greater than its horizontal dimension by passing a gaseous stream comprising hydrogen sulfide and hydrogen upwardly through a plurality of regenerated catalyst particles confined in an activation zone maintained at a temperature sufficient to convert said Group VI and/or Group VIII metal oxides into the corresponding sulfides, (2) establishing at least one downflow zone and one upflow zone wherein each downflow zone is in fluid communication with a downstream upflow zone within each bed and maintaining the height of the particles in said upflow zone at the same height as the height of the particles in the adjacent upstream downflow zone to provide a looped pathway through each said ebullating bed, wherein each circuit of each of said loops are oriented along and approximately twice the length of said ebullating bed, passing said regenerated catalyst into said ebullating bed and moving said regenerated catalyst along said multi-looped pathway for a time sufficient to sub stantially convert said Group VI and Group VIII metal oxide to the corresponding metal sulfide, (3) removing an activated catalyst from said ebullating bed, (4) establishing at least one ebullating or expanded bed each said bed having a vertical dimension substantially greater than its horizontal dimension by passing a gaseous stream comprising oxygen upwardly through a plurality of activated catalyst particles confined in a passivation zone maintained at a temperature sufficient to convert said Group VI and/or Group VIII metal sulfides into the corresponding oxides at the surface thereof, (5) establishing at least one downflow zone and one upflow zone wherein each downflow zone is in fluid communication with a downstream upflow zone within each bed and maintaining the height of the particles in said upflow zone at the same height as the height of the particles in the adjacent upstream downflow zone to provide a looped pathway through each said ebullating bed, wherein each circuit of each of said loops are oriented along and approximately twice the length of said ebullating bed, passing said activated catalyst into said ebullating bed and moving said activated catalyst along said multi-looped pathway for a time sufficient to substantially convert said Group VI and Group VIII metal sulfide to the corresponding metal oxide at the surface thereof, and (6) removing a passivated catalyst from said ebullating bed.

In a final aspect of the invention, a process is provided for continuously activating and passivating a regenerated catalyst which has been deactivated by use in a petroleum conversion process whereby sufficient carbon and sulfur have been deposited on the surface thereof to substantially reduce the catalytic activity, and said deactivated catalyst has been regenerated by calcining in an oxygen-containing gas to remove said carbon and sulfur and, as a result of said calcining, one or more Group VI metal or Group VIII metal components included in said catalyst are oxidized to the metal oxides, which comprises the steps of:

(1) establishing first and second ebullating beds each having a vertical dimension substantially greater than its horizontal dimension by passing a gaseous stream comprising hydrogen and hydrogen sulfide upwardly through a plurality of regenerated catalyst particles and confining said ebullating beds in a first and second activation zone, respectively, (2) establishing at least one downflow zone and upflow zone wherein each downflow zone is in fluid communication with a downstream upflow zone within each bed and maintaining the height of the particles in said upflow zone at the same height as the height of the particles in the adjacent upstream downflow zone to provide a continuous looped pathway through each said ebullating bed, wherein each bed encompasses at least one loop of a continuous multi-looped pathway and wherein the circuit of each of said encompassed loops is oriented along and approximately twice the length of the vertical dimension of the ebullating bed within which it is encompassed, (3) passing said regenerated catalyst into said first activation zone and moving said regenerated catalyst along said continuous multi-looped pathway, (4) maintaining the temperature of each activation zone at a level sufficient to substantially convert Group VI and/or Group VIII metal oxides supported on alumina to the corresponding sulfides of said regenerated catalyst as it moves through the reactivation zone, (5) removing an activated catalyst from said second reactivation zone.

(6) establishing at least one ebullating or expanded bed each said bed having a vertical dimension substantially greater than its horizontal dimension by passing a gaseous stream comprising oxygen upwardly through a plurality of activated catalyst particles confined in a passivation zone maintained at a temperature sufficient to convert said Group VI and/or Group VIII metal sulfides into the corresponding oxides at the surface thereof, (7) establishing at least one downflow zone and one upflow zone wherein each downflow zone is in fluid communication with a downstream upflow zone within each bed and maintaining the height of the particles in said upflow zone at the same height as the height of the particles in the adjacent upstream downflow zone to provide a looped pathway through each said ebullating bed, wherein each circuit of each of said loops are oriented along and approximately twice the length of said ebullating bed, passing said activated catalyst into said ebullating bed and moving said activated catalyst along said multi-looped pathway for a time sufficient to substantially convert said Group VI and Group VIII metal sulfide to the corresponding metal oxide at the surface thereof, and (8) removing a passivated catalyst from said ebullating bed.

BRIEF DESCRIPTION OF THE DRAWINGS

The invention will be more readily understood by reference to the drawings wherein like numerals refer to like elements and in which.

DETAILED DESCRIPTION OF THE INVENTION

Figure 1:
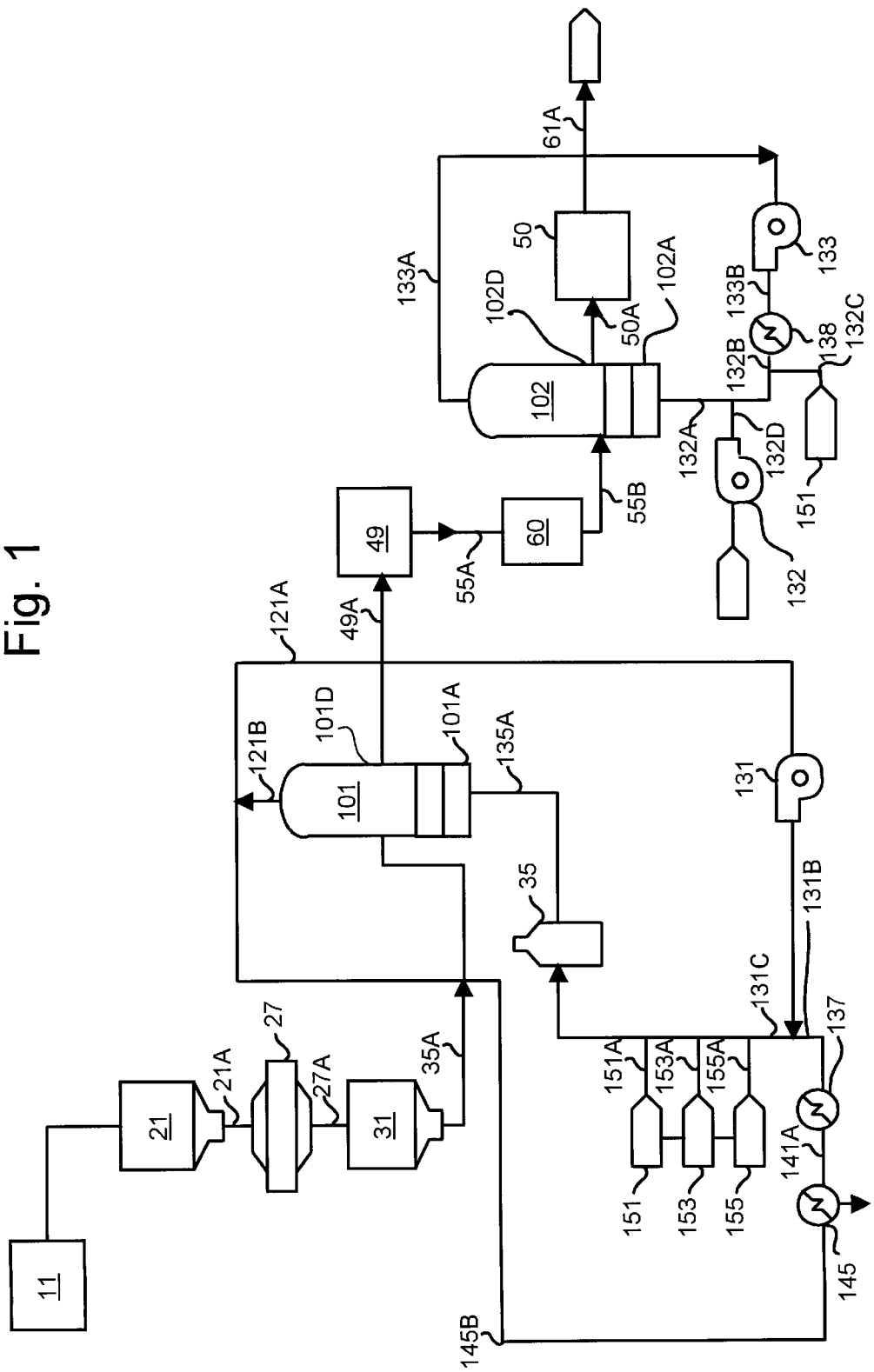
FIG. 1 is a schematic diagram illustrating the presulfiding and passivating process of this invention.

The present invention may be conveniently understood by reference to the preferred embodiment illustrated in FIG. 1.

The apparatus utilized in the process of the present invention comprises means 11 for passing a fresh or regenerated catalyst into the feed hopper 21 from which it is passed through conduit 21A into the solids dryer 27 wherein the catalyst is preheated by direct or indirect heating, from ambient temperature to about 450° F.

The heated catalyst is gravity-fed through conduit 27A into hot feed tank 31. Once hot feed tank 31 is full, as indicated by a load cell (not shown), the hot feed tank is isolated from the outside atmosphere by closure of vent valves (not shown). The hot feed tank is then purged with nitrogen. Once all the oxygen is removed from the catalyst containing hot feed tank, the catalyst is passed through conduit 35A, from the hot feed tank 31, into fluid bed reactor 101. The fluid bed reactor 101, as well as the downstream catalyst cooler 49, and the passivation fluid bed reactor 102 are purged with nitrogen prior to heating the fluid bed reactor 101.

A first fluidizing blower 131 recirculates the inert gas exiting fluid bed reactor 101 overhead through conduits 121A and 121B. The recirculated inert gas is passed through conduit 131A and 131C to heater 135, wherein it is heated to about 750° F. before passing through conduit 135A into fluid bed reactor 101 through fluidizing gas inlet 101A.

As further seen in FIG. 1, a slip stream of the recirculated inert gas may be removed by means of conduit 131B and passed into a first heat exchanger 137 wherein it is cooled to about 300° F. The cooled slip stream is then passed through conduit 141A to a second heat exchanger 145 wherein it is further cooled to about 50° F. in order to remove water that has been generated in the sulfiding reaction carried out in the fluid bed reactor 101. The twice-cooled slip stream is then passed through conduit 145B and reinjected into conduit 121A containing the fluidizing gas exiting the fluid bed reactor 101.

The catalyst feed from the hot feed tank 31 to the fluid bed reactor 101 is started simultaneously with the hydrogen sulfide feed from hydrogen sulfide source 153 and hydrogen feed from hydrogen source 155. The hydrogen sulfide and hydrogen are passed through conduit 153A and conduit 155A, respectively, into conduit 131C and ultimately to the inlet of 101A of the fluid bed reactor 101, by way of conduit 131C, heater 135 and conduit 135A. Nitrogen is also added to the fluidizing gas from nitrogen source 151 through conduit 151A.

The fluid bed reactor 101 fills with catalysts particles, which overflow through catalyst outlet 101D through conduit 49A into catalyst cooler 49. Catalyst cooler 49 is isolated from the passivation fluid bed reactor 102 by a tank locking system 60. The locking vessel 60 keeps the oxygen atmosphere in the passivation fluid bed reactor 102 separated from the hydrogen and hydrogen sulfide atmosphere in the catalyst cooler 49. The locking vessel 60 is isolated from both the catalyst cooler 49 and the passivation fluid bed reactor 102 and is purged with nitrogen to remove any trace amounts of oxygen. The locking vessel 60 is then filled with cooled catalyst, at approximately 120° F., from the catalyst cooler 49. The locking vessel 60 is then isolated from the catalyst cooler 49 and again purged with nitrogen to remove any trace amounts of hydrogen and hydrogen sulfide. It is then opened to the passivation fluid bed reactor 102 and the catalyst flows through conduit 55B into the fluid bed passivation reactor 102.

In the fluid bed passivation reactor 102, the catalyst particles are contacted with a nitrogen gas stream containing preferably between 0.25 and 2.5% by volume oxygen. The residence time in the fluid bed passivation reactor may vary from 10 minutes to 30 minutes. The fluid bed passivation reactor 102 fills with catalyst particles, which overflow through catalyst outlet 102D through conduit 50A into catalyst cooler 50. The catalyst particles are discharged from catalyst cooler 50 at a temperature of around 120° F. and are passed to the packaging station through conduit 61A for packaging.

A second fluidizing blower 133 recirculates the gas stream exiting the passivation fluid bed reactor 102 overhead through conduit 133A. The recirculated gas is cooled in gas cooler 138 to between 90° and 120° F. The recirculated gas exits the gas cooler 138 through conduit 132B. Nitrogen is added as required from nitrogen source 151 through conduit 132C. Air is added using air blower 132 through conduit 132D. Air is used to maintain an oxygen concentration of from 0.25 to 21 percent, preferably between 0.25 percent and 2.5 percent by volume in the gas stream entering the passivation fluid bed reactor. The gas stream enters the passivation fluid bed reactor through fluidizing gas inlet 102A.

Figure 2:
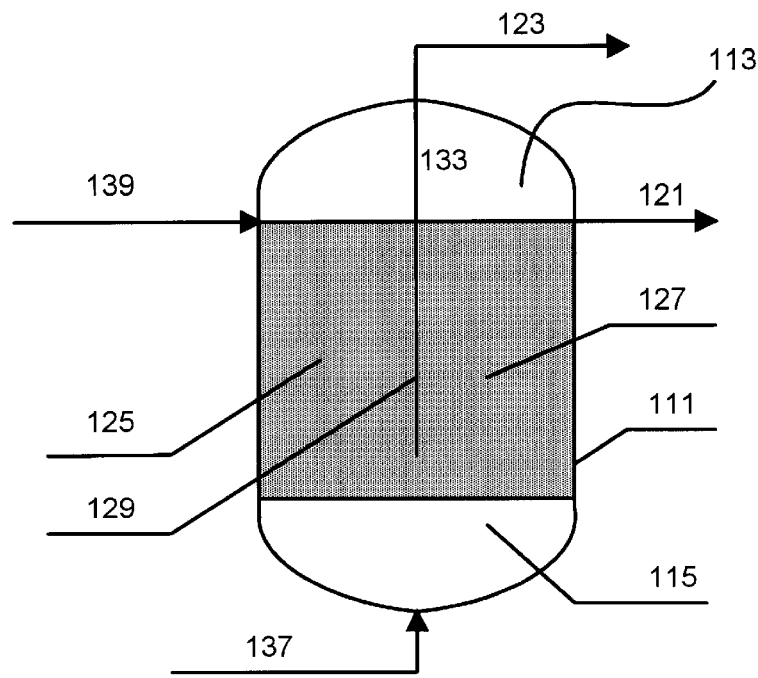
FIG. 2 is a longitudinal cross-sectional view of a fluid bed reactor useful in the process of the invention including a baffle to divide the bed of catalyst particles into separate zones, the volume of each said separate zone being approximately one-half of the volume of the bed of said catalyst particles.
Figure 3:
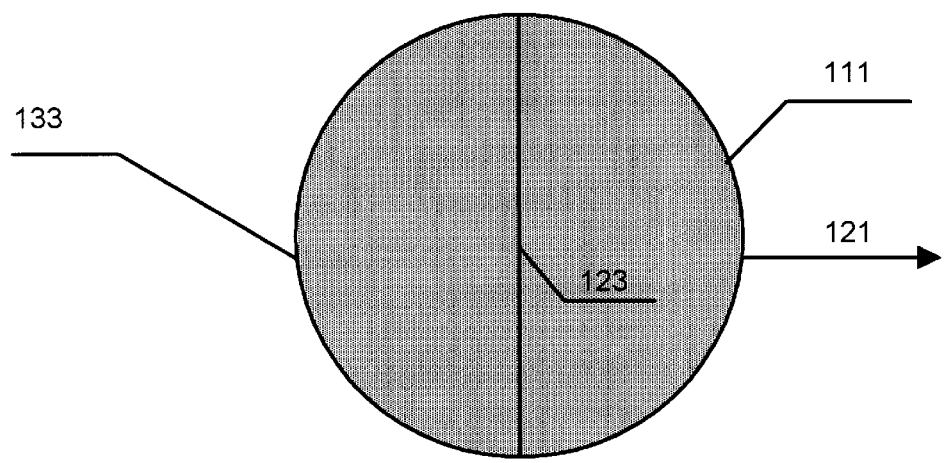
FIG. 3 is a transverse cross-sectional view of the fluid bed reactor of FIG. 2 taken along line A—A, showing the orientation of the baffle.

Referring now to FIGS. 2 and 3, the fluid bed reactors 101 and 102 and the method of sulfiding and passivating catalyst particles carried out therein may be described in more detail as follows:

A preferred embodiment of the sulfiding method of this invention utilizes an expanded bed of a fresh or regenerated hydrocarbon conversion catalyst, e.g., hydroprocessing catalyst stabilized with nitrogen or other inert gas containing hydrogen and hydrogen sulfide, each in the range of from about 3 percent to about 10 percent, by volume, and preferably from about 3 percent to about 6 percent, by volume, and most more preferably about 5 percent, by volume, to effect the conversion of substantially all of the Group VI and/or Group VIII metal oxides on said catalyst to the corresponding sulfides. Typical catalyst particles sizes may range from $\frac{1}{32}$" to $\frac{1}{8}$" diameter but are not limited thereto.

A preferred embodiment of the passivation method of this invention utilizes an expanded bed of a presulfided hydrocarbon conversion catalyst, e.g. presulfided hydroprocessing catalyst stabilized with nitrogen or other inert gas containing oxygen in the range of from 0.25 percent to 21 percent by volume, preferably from about 0.25 percent to about 2.5 percent, by volume, and more preferably from about 0.5 percent to about 1.5 percent, by volume, and most preferably about 1 percent, by volume, to passivate said catalyst against self heating by reacting exothermally with atmospheric oxygen. Typical catalyst particle sizes may range from $\frac{1}{32}$" to $\frac{1}{8}$" diameter but are not limited thereto.

As shown in FIG. 2, a vertical column 111 confines a bed of catalyst particles 113. A distributor grid 115 serves to support the particles and distribute a gas passing therethrough from below. The fluidizing gas is introduced below the catalyst bed through inlet 137 and distributor grid 115 to provide mild expansion of the bed. Minimum threshold fluidizing velocities and fluidizing gas volumes are utilized to prevent unnecessary attrition and to maintain minimum particle-to-particle contacting in the expanded bed. Fresh or regenerated catalyst with 10 to 25 weight percent molybdenum oxides or tungsten oxides, 2 to 6 weight percent nickel oxides typically are introduced into the top of the expanded bed through inlet 139. After contacting with the fluidizing gas, which adds process heat by the conversion of the metal oxides to the corresponding metal sulfides, the catalyst flows through the reaction system like a fluid and is removed through outlet 121. Exhaust gases pass overhead through outlet 123 to a cyclone (not shown) to remove catalyst fines.

In the compact or fixed bed reactor, it is difficult to produce satisfactory catalyst under a wide range of operating conditions, i.e., temperatures up to 1200° F. beyond which damage to the catalyst support (alumina or silica-alumina) could occur, contact or residence times covering several hours, etc.

While not wishing to be bound by theory, it is believed that bypassing occurs in the reactor of the prior art. This bypassing results in incomplete conversion of the metal oxides to the corresponding metal sulfides. Thus, a baffle is installed in the fluid bed reactor of FIGS. 2 and 3, to separate the two divided flow areas into a downflow zone 125 on the left and an upflow zone 127 on the right. See FIGS. 2 and 3 wherein baffle 129 is shown as oriented upwardly and extending approximately the height of the particle bed and dividing the bed into two equal volumes. The baffle 129 and the interior walls of the vertical column 111 define a tortuous or looped path for the catalyst particles. (For purposes of this invention, a tortuous or looped path is one requiring at least one change of direction of 180° from the beginning to the end thereof. Of course, the pathway may be multi-looped, i.e., in a pathway with two loops, the change in direction is 360° F.) The catalyst stream passes the under the baffle opening 171 shown at the bottom and flows continuously like a liquid. In this way, substantially all of the catalyst has a tortuous or looped path to reach the outlet, while moving through the same total reactor volume prior to leaving the reactor. That is, substantially none of the catalyst particles may pass along a path from inlet 139 to the outlet 121 without at least one change in direction of 180° therebetween.

Figure 4:
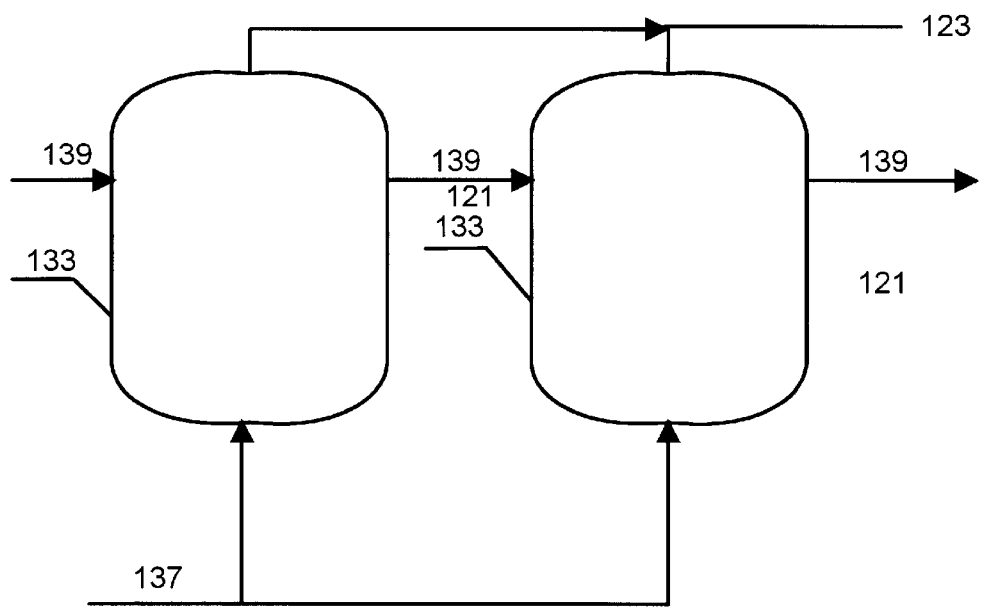
FIG. 4 is a schematic illustration of the preferred embodiment of the apparatus utilized in the process of the present invention.

The system shown in FIG. 4 provides increased flexibility for processing both smaller and larger sized catalysts. Two or more (preferably three or more) reactors are used in series to provide required tortuosity together with minimum residence time. Each reactor has a center baffle dividing the cross-sectional area into equal sectors, as shown in FIGS. 2 and 3.

Fluidizing gas may be manifolded to the individual reactors to handle smaller, i.e., $\frac{1}{16}$ inch catalyst. For larger size, or $\frac{1}{8}$ inch catalyst, more of the fluidizing gas can be directed to the first reactor to effect required bed expansion. In all of these systems, bed expansion is the minimum expansion (i.e., minimum fluidizing gas) as required, for a stable (expanded) bed volume of approximately 10% to 100% greater than the corresponding dense bed volume. Fluidization or expansion of the beds in excess of this is a result of higher gas and such higher rates substantially increase scrubbing requirements. Increased attrition and carryover of entrained catalyst also may result.

The invention is further illustrated by the following examples which are illustrative of various aspects of the invention and are not intended as limiting the scope of the invention as defined by the appended claims.

EXAMPLE 1

In a fluid bed reactor substantially as described in FIGS. 2 and 3, except that no baffle is provided, the following sulfiding process is carried out. The catalyst has the following composition:NiO at 4 percent, by weight, $MoO_3$ at 24 percent, by weight, and the remainder alumina.

Nitrogen gas, a flow rate of 10 L/min., was passed through a bed of said catalyst particles confined in a cylindrical reactor having the dimensions $\frac{3}{4}$ inch in diameter and 12 inches in height. The catalyst bed is heated to a temperature of 450° F. by a natural gas burner. The nitrogen gas is heated by a series of electrical heating tapes and continues to flow through the bed for 30 minutes or until the catalyst is completely dry. The natural gas burner temperature is increased and the nitrogen flow rate is increased to 24 L/min. When the temperature of 700° F. is reached, hydrogen sulfide at a flow rate of 0.3 L/min. and hydrogen at a flow rate of 1.021 L/min. are metered into the nitrogen stream to provide a weight percent concentration of 3.0% and 1.8% of hydrogen and hydrogen sulfide, respectively, in the fluidizing gas. After 1 hour and 35 minutes in the catalyst bed, the flow of hydrogen sulfide and hydrogen is stopped, the nitrogen gas flow is reduced back to 10 L/min. and the natural gas burner is turned off. The bed is allowed to cool until a temperature of 100° F. is reached. The catalyst is passivated in hydrocarbon for a period of 10 minutes. The excess hydrocarbon is then stripped by heating in an oven at 310° F. for 10 minutes to yield a catalyst having 10.6 weight percent sulfide which is approximately 100 percent of theoretical. The final amount of hydrocarbon on the catalyst is 19.6 percent by weight. Samples of the catalyst taken from the top of the bed and the bottom of the bed show that the sulfide content is uniform throughout the bed, i.e., a homogeneous sulfided catalyst is obtained. This example demonstrates that a fluidized bed process for sulfiding a hydrocarbon conversion catalyst comprising a Group VII and a Group VI oxide yields a homogeneous sulfided catalyst.

EXAMPLE 2

A catalyst similar to the catalyst utilized in Example 1 is utilized in this example. This catalyst has the following composition: NiO at 4.1 percent, by weight, $MoO_3$ at 20.3 percent, by weight, and the remainder alumina.

In the process of this Example 2, the flow rate of the nitrogen gas passed through the fluid bed reactor is maintained at 7.275 L/min. which is insufficient to fluidize the catalyst bed. The nitrogen is heated to provide a temperature of 743° F. at the inlet of the fluid bed reactor and 738° F. at the exhaust. Hydrogen sulfide is passed through the packed bed reactor for 35 minutes. The inlet temperature varies between 743° F. and 856° F. during the reaction. The exhaust temperature varies between 738° F. and 798° F. After the reaction is terminated by ceasing the flow of hydrogen sulfide and the sulfided catalyst is cooled, the catalyst bed is sampled from the bottom to the top at every two inches along the length of the catalyst bed with the following results:

| Height of Catalyst Bed/Inches | Percent Sulfur, By Weight |
| --- | --- |
| 0–2 | 10.26 |
| 2–4 | 8.55 |
| 4–6 | 3.66 |
| 6–8 | 1.33 |
| 8–10 | 0.61 |

The above results demonstrate that the prior art process for sulfiding a hydrocarbon conversion catalyst, which does not utilize a fluid bed reactor, see, e.g., U.S. Pat. No. 3,453,217, results in a catalyst that is not homogeneous regarding sulfide content throughout the bed.

EXAMPLE 3

The process of Example 1 is repeated except that the nitrogen gas is passed through the packed bed reactor at a rate of 5.4 L/min., which is insufficient to fluidize the catalyst bed. After 4 hours of treatment, a catalyst having a sulfide content of 11.2 percent by weight is recovered. However, as compared to Example 1, 4 hours reaction time is necessary rather than less than 1 hour to obtain a fully sulfided catalyst.

EXAMPLE 4

After the sulfiding step described in Example 1 was completed, without any test catalyst passivation, the test catalyst was cooled by passing a gas stream of 10 L/min of nitrogen through the fluid bed reactor without an external heat source, until the test catalyst temperature was below 100° F. The catalyst was removed from the reactor vessel and exposed to ambient conditions.

The test catalyst exhibited severe self heating properties when removed from the vessel. The test catalyst underwent an immediate and severe temperature increase to 240° F. before subsiding. During the period of self-heating, significant liberation of sulfur oxides was observed indicating reoxidation of the sulfided metal sites.

EXAMPLE 5

A test catalyst was sulfided as described in Example #1. The sulfided catalyst was cooled to a temperature of 122° F. by passing a 10L/min. gas stream of nitrogen through the test catalyst. At 122° F., the nitrogen gas flow rate was changed to 24L/min to again fluidize the test catalyst and the temperature of the test catalyst was maintained at 122° F. with the electrically heated gas stream. Oxygen was added to the gas stream to maintain 1 vol % oxygen in the gas stream. The gas volumes and temperature were maintained for 30 minutes. After 30 minutes, the oxygen supply was turned off, the nitrogen volume was reduced to 10L/min., the external electric heat was turned off and the test catalyst was cooled to ambient temperature in an inert atmosphere.

Once the test catalyst was cooled to ambient temperature, the test catalyst was removed from the reactor vessel and exposed to ambient conditions. The test catalyst did not exhibit any of the self heating properties as the test catalyst in Example 4 did. Sulfur dioxide was not detected around the test catalyst.

EXAMPLE 6

The sample prepared as in Example 1 and stabilized using the techniques of Example 5 was loaded into the activity testing pilot plant. After the oxygen was removed by purging the plant with nitrogen, hydrogen was introduced and the plant heated to 150° C. At 150° C., oil was introduced. The oil used for all tests had the following qualities:

Specific Gravity$_{20}$: 0.877

Boiling Range: 240 to 390° C.

Sulfur Content: 1.12 wt. %

Basic Nitrogen: 148 mg $NH_3/l$

The pilot plant was operated at the following conditions:

Pressure: 40 bar

LSHV: 2 hr$^{-1}$

Catalyst content: 65 ml diluted with 65 ml inerts

Once through

The pilot plant was then heated to 310° C. and denitrification and desulfurization was measured in 20° C. increments to 370° C.

The results of this test were compared with the results of a test using catalyst sulfided in-situ. The unit was heated to 150° C. at which time 2% Dioctylpentasulfide (DOPS) was introduced. The temperatures were then raised in accordance with the following schedule:

150° C. 1 hr

200° C. 4 hr
220° C. 8 hr
240° C. 4 hr
260° C. 4 hr
280° C. 4 hr
300° C. 4 hr
350° C. 4 hr

After the sulfiding, the temperature was lowered to 310° C. and the oil was introduced. The denitrification and desulfurization was again measured in 20° C. increments to 370° C.

The test results for the in-situ sulfided catalyst were compared with the pre-sulfided material. The results showed no significant difference as can be seen from the data.

| Catalyst Temperature in ° C. | Example 5 catalyst | In-situ DOPS |
|---|---|---|
| Weight % Sulfur in Raffinate | | |
| 310 | 0.408 | 0.412 |
| 330 | 0.227 | 0.237 |
| 350 | 0.097 | 0.095 |
| 370 | 0.042 | 0.037 |
| Basic Nitrogen in raffinate in mg $NH_3/l$ | | |
| 310 | 131 | 116 |
| 330 | 108 | 105 |
| 350 | 90 | 87 |
| 370 | 55 | 61 |

While particular embodiments of the invention have been described, it will be understood, of course, that the invention is not limited thereto since many obvious modifications can be made, and it is intended to include within this invention any such modification as will fall within the scope of the appended claims:

What is claimed is:

1. A process for continuously activating a fresh or regenerated catalyst comprising at least one Group VI or Group VIII metal oxide supported on a particulate refractory oxide support material by converting substantially all of said Group VI or Group VIII metal oxide to the corresponding metal sulfide and passivating the resulting activated catalyst, which comprises the steps of:
   (A) sulfiding said fresh or regenerated catalyst by;
      (1) establishing at least one ebullating or expanded bed by passing a gaseous stream comprising hydrogen sulfide and hydrogen upwardly through a plurality of particles of said fresh or regenerated catalyst confined in an activation zone,
      (2) establishing at least one downflow zone and at least one upflow zone wherein each downflow zone is in fluid communication with a downstream upflow zone within each bed and maintaining the height of the particles in each upflow zone at the same height as the height of the particles in the adjacent upstream downflow zone to provide a looped pathway in said ebullating or expanded bed,
      (3) passing said regenerated or fresh catalyst into said ebullating or expanded bed and moving said fresh or regenerated catalyst along said looped pathway, and
      (4) removing a catalyst comprising substantially all of the Group VI and/or Group VIII metals as sulfides; and
   (B) passivating said sulfided or active catalyst by
      (1) establishing at least one ebullating or expanded bed by passing a gaseous stream comprising oxygen upwardly through a plurality of particles of said catalyst confined in a passivation zone,
      (2) establishing at least one downflow zone and at least one upflow zone wherein each downflow zone is in fluid communication with a downstream upflow zone within each bed and maintaining the height of the particles in each upflow zone at the same height as the height of the particles in the adjacent upstream downflow zone to provide a looped pathway in said ebullating or expanded bed,
      (3) passing said activated catalyst into said ebullating or expanded bed and moving said activated catalyst along said looped pathway, and
      (4) removing a passivated catalyst that is resistant to self heating by reacting exothermally with atmospheric oxygen.

2. The process of claim 1 wherein said pathway in said activation zone changes in direction at least about 360° from the beginning to the end.

3. The process of claim 1 further comprising passing said gas through said beds to thereby provide a bed volume that is about 10 to 100% greater than the volume of the packed bed.

4. The process of claim 1 wherein said gas passed through said activation zone comprises from about 3 to 10 percent by volume hydrogen sulfide and from 3 to 10 percent by volume hydrogen.

5. The process of claim 1 wherein said fresh or regenerated catalyst is contacted with said gas in said activation zone at a temperature sufficient to convert Group VI and Group VIII metal oxides to the corresponding sulfides but not greater than about 750° F.

6. The process of claim 1 wherein said regenerated catalyst has been regenerated after deactivation in the hydroprocessing of hydrocarbon feeds by calcining in an oxygen-containing gas.

7. The process of claim 1 wherein said fresh or regenerated catalyst comprises one or more catalytic metals selected from the group consisting of cobalt, molybdenum, nickel and tungsten.

8. The process of claim 1 further comprising contacting said activated catalyst with from 0.25 to 21 percent by volume oxygen in said passivation zone for a time and at a temperature sufficient to passivate said catalyst.

9. The process of claim 7 wherein said fresh or regenerated catalyst comprises from 10 to 25 percent molybdenum oxides, from 2 to 6 percent cobalt oxides, and 2 to 6 percent nickel oxides, by weight, on alumina or alumina/zeolite.

10. A process for continuously activating and passivating a regenerated catalyst which has been deactivated by use in a petroleum conversion process whereby sufficient carbon and sulfur have been deposited on the surface thereof to substantially reduce the catalytic activity and said deactivated catalyst has been regenerated by calcining in an oxygen-containing gas to remove said carbon and sulfur and, as a result of said calcining, one or more Group VI metal or Group VIII metal components included in said catalyst are oxidized to the metal oxides, which comprises the steps of:
   (1) establishing at least one ebullating or expanded bed each said bed having a vertical dimension substantially the same as its horizontal dimension by passing a gaseous stream comprising hydrogen sulfide and hydrogen upwardly through a plurality of regenerated catalyst particles confined in an activation zone maintained at a temperature sufficient to convert said Group VI and/or Group VIII metal oxides into the corresponding sulfides, (2) establishing at least one downflow zone and one upflow zone wherein each downflow zone is in fluid communication with a downstream upflow zone within each bed and maintaining the height of the particles in said upflow zone at the same height as the height of the particles in the adjacent upstream downflow zone to provide a looped pathway through each said bed, wherein each circuit of each of said loops are oriented along and approximately twice the length of said bed, passing said regenerated catalyst into said bed and moving said regenerated catalyst along said multi-looped pathway for a time sufficient to substantially convert said Group VI and Group VIII metal oxide to the corresponding metal sulfide, (3) removing an activated catalyst from said bed, (4) establishing at least one ebullating or expanded bed each said bed having a vertical dimension substantially greater than its horizontal dimension by passing a gaseous stream comprising oxygen upwardly through a plurality activated catalyst particles confined in a passivation zone maintained at a temperature sufficient to convert said Group VI and/or Group VIII metal sulfides into the corresponding oxides at the surface thereof, (5) establishing at least one downflow zone and one upflow zone wherein each downflow zone is in fluid communication with a downstream upflow zone within each bed and maintaining the height of the particles in said upflow zone at the same height as the height of the particles in the adjacent upstream downflow zone to provide a looped pathway through each said bed, wherein each circuit of each of said loops are oriented along and approximately twice the length of said bed, passing said activated catalyst into said bed and moving said activated catalyst along said multi-looped pathway for a time sufficient to substantially convert said Group VI and Group VIII metal sulfide to the corresponding metal oxide at the surface thereof, and (6) removing a passivated catalyst from said bed.

11. The process of claim 10 further comprising establishing at least two ebullating beds in said activation zone and wherein said pathway changes in direction at least about 540° from the beginning to the end.

12. The process of claim 10 further comprising passing said gas through said beds to thereby provide a bed volume that is about 10 to 100% greater than the volume of the packed bed.

13. The process of claim 12 wherein said gas passed through said activation zone comprises from about 3 to 10 percent by volume hydrogen sulfide and from 3 to 10 percent by volume hydrogen.

14. The process of claim 10 wherein said fresh or regenerated catalyst is contacted with said gas in said activation zone at a temperature sufficient to convert Group VI and Group VIII metal oxides to the corresponding sulfides but not greater than about 750° F.

15. The process of claim 10 wherein said regenerated catalyst has been regenerated after deactivation in the hydroprocessing of hydrocarbon feeds by calcining in an oxygen-containing gas.

16. The process of claim 10 wherein said regenerated catalyst comprises one or more catalytic metals selected from the group consisting of cobalt, molybdenum, nickel, and tungsten.

17. The process of claim 10 further comprising contacting said activated catalyst with from 0.25 to 21 percent by volume oxygen in said passivation zone for a time and at a temperature sufficient to passivate said catalyst.

18. The process of claim 16 wherein said regenerated catalyst comprises from 10 to 25 percent molybdenum oxides, from 2 to 6 percent cobalt oxides, and 2 to 6 percent nickel oxides, by weight on alumina or alumina/zeolite.

19. A process for continuously activating and passivating a fresh or regenerated catalyst which has been deactivated by use in a petroleum conversion process whereby sufficient carbon and sulfur have been deposited on the surface thereof to substantially reduce the catalytic activity, and said deactivated catalyst has been regenerated by calcining in an oxygen-containing gas to remove said carbon and sulfur and, as a result of said calcining, one or more Group VI metal or Group VIII metal components included in said catalyst are oxidized to the metal oxides, which comprises the steps of:

(1) establishing first and second ebullating beds each having a vertical dimension substantially the same as its horizontal dimension by passing a gaseous stream comprising hydrogen and hydrogen sulfide upwardly through a plurality of regenerated catalyst particles and confining said ebullating beds in a first and second activation zone, respectively, (2) establishing at least one downflow zone and upflow zone wherein each downflow zone is in fluid communication with a downstream upflow zone within each bed and maintaining the height of the particles in said upflow zone at the same height as the height of the particles in the adjacent upstream downflow zone to provide a continuous looped pathway through each said ebullating bed, wherein each bed encompasses at least one loop of a continuous multi-looped pathway and wherein the circuit of each of said encompassed loops is oriented along and approximately twice the length of the vertical dimension of the ebullating bed within which it is encompassed, (3) passing said regenerated catalyst into said first activation zone and moving said regenerated catalyst along said continuous multi-looped pathway, (4) maintaining the temperature of each activation zone at a level sufficient to substantially convert Group VI and/or Group VIII metal oxides supported on alumina to the corresponding oxides of said regenerated catalyst as it moves through the regeneration zone, and (5) removing an activated catalyst from said second reactivation zone, (6) establishing at least one ebullating bed each said bed having a vertical dimension substantially greater than its horizontal dimension by passing a gaseous stream comprising oxygen upwardly through a plurality of activated catalyst particles confined in a passivation zone, (7) establishing at least one downflow zone and one upflow zone wherein each downflow zone is in fluid communication with a downstream upflow zone within each bed and maintaining the height of the particles in said upflow zone at the same height as the height of the particles in the adjacent upstream downflow zone to provide a looped pathway through each said ebullating bed, wherein each circuit of each of said loops are oriented along and approximately twice the length of said ebullating bed, passing said activated catalyst into said ebullating bed and moving said activated catalyst along said multi-looped pathway for a time sufficient to passivate the metals against self heating, and (8) removing a passivated catalyst from said ebullating bed.

20. The process of claim 19 further comprising passing said gas through said ebullating beds to thereby provide a bed volume that is about 10 to 100% greater than the volume of the packed bed.

21. The process of claim 20 wherein said gas passed through said activation zone comprises from about 3 to 10 percent by volume hydrogen sulfide and from 3 to 10 percent by volume hydrogen.

22. The process of claim 21 wherein said fresh or regenerated catalyst is contacted with said gas in said activation zone at a temperature sufficient to convert Group VI and Group VIII metal oxides to the corresponding sulfides but not greater than about 750° F.

23. The process of claim 22 wherein said regenerated catalyst has been regenerated after deactivation in the hydroprocessing of hydrocarbon feeds by calcining in an oxygen-containing gas.

24. The process of claim 23 wherein said regenerated catalyst comprises one or more catalytic metals selected from the group consisting of cobalt, molybdenum, nickel, and tungsten.

25. The process of claim 24 further comprising contacting said activated catalyst with from 0.25 to 21 percent by volume oxygen in said passivation zone for a time and at a temperature sufficient to passivate said catalyst.

26. The process of claim 24 wherein said regenerated catalyst comprises from 10 to 25 percent molybdenum oxides, from 2 to 6 percent cobalt oxides, and 2 to 6 percent nickel oxides, by weight on alumina or alumina/zeolite.

27. A process for continuously activating a fresh or regenerated catalyst comprising at least one Group VI or Group VIII metal oxide supported on a particulate refractory oxide support material by converting substantially all of said Group VI or Group VIII metal oxide to the corresponding metal sulfide, and passivating said activated catalyst which comprises the steps of:

(A) sulfiding said fresh or regenerated catalyst by;
  (1) establishing at least one ebullating or expanded bed by passing a gaseous stream comprising hydrogen sulfide and hydrogen upwardly through a plurality of particles of said catalyst confined in an activation zone,
  (2) establishing an upflow zone to provide a pathway in said bed,
  (3) passing said regenerated or fresh catalyst into said bed and moving said fresh or regenerated catalyst along said pathway,
  (4) removing a catalyst comprising substantially all of the Group VI and/or Group VIII metals as sulfides;
(B) passivating said sulfided or active catalyst by
  (1) establishing at least one ebullating or expanded bed by passing a gaseous stream comprising oxygen upwardly through a plurality of activated catalyst confined in a passivation zone,
  (2) establishing at least one downflow zone and at least one upflow zone wherein each downflow zone is in fluid communication with a downstream upflow zone within each bed and maintaining the height of the particles in each upflow zone at the same height as the height of the particles in the adjacent up stream downflow zone to provide a looped pathway in said ebullating or expanded bed,
  (3) passing said activated catalyst into said bed and moving said activated catalyst along said looped pathway, and
  (4) removing a passivated catalyst that is resistant to self heating by reacting exothermally with atmospheric oxygen.

28. The process of claim 1 wherein the particle size of said catalyst ranges from 1/32" to 1/8" in diameter.

29. The process of claim 10 wherein the particle size of said catalyst ranges from 1/32" to 1/8" in diameter.

30. The process of claim 19 wherein the particle size of said catalyst ranges from 1/32" to 1/8" in diameter.

* * * * *